(12) United States Patent
Biller et al.

(10) Patent No.: US 8,911,028 B2
(45) Date of Patent: Dec. 16, 2014

(54) METHOD FOR OPERATING A BRAKING SYSTEM

(75) Inventors: Harald Biller, Eschborn (DE); Gunther Buschmann, Idstein (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 33 days.

(21) Appl. No.: 13/643,211

(22) PCT Filed: Dec. 17, 2010

(86) PCT No.: PCT/EP2010/070011
§ 371 (c)(1),
(2), (4) Date: Oct. 24, 2012

(87) PCT Pub. No.: WO2011/134552
PCT Pub. Date: Nov. 3, 2011

(65) Prior Publication Data
US 2013/0033097 A1    Feb. 7, 2013

(30) Foreign Application Priority Data

Apr. 28, 2010 (DE) .......................... 10 2010 028 279

(51) Int. Cl.
*B60T 13/66* (2006.01)
*B60T 7/04* (2006.01)
*B60T 8/40* (2006.01)

(52) U.S. Cl.
CPC ............. *B60T 7/042* (2013.01); *B60T 2270/82* (2013.01); *B60T 13/662* (2013.01); *B60T 8/4077* (2013.01); *B60T 8/4059* (2013.01)
USPC ................................ 303/15; 303/3; 303/115.2

(58) Field of Classification Search
USPC ................ 303/3, 15, 115.1, 115.2, 119.1, 11, 303/115.4, 116.1
See application file for complete search history.

(56) References Cited

U.S. PATENT DOCUMENTS 6,494,546 B1   12/2002   Feigel
2011/0115282 A1*   5/2011   Dinkel et al. ..................... 303/3

FOREIGN PATENT DOCUMENTS

DE          44 25 578 A1    1/1996
DE         100 60 225 A1   10/2001
DE    10 2004 027 256 A1    1/2005
DE    10 2004 025 638 A1    9/2005

(Continued)

OTHER PUBLICATIONS

German Examination Report—Apr. 28, 2010.

(Continued)

*Primary Examiner* — Robert A Siconolfi
*Assistant Examiner* — Vu Q Nguyen
(74) *Attorney, Agent, or Firm* — Brinks Gilson & Lione

(57) ABSTRACT

A system and method for operating a hydraulic braking system) for motor vehicles with an electrically controllable pressure provision device), a high-pressure accumulator, which can be connected to the pressure provision device via a hydraulic connection), in which an electrically controllable shutoff valve is arranged, wheel brakes, which can be supplied with pressure medium by means of the pressure provision device and/or the high-pressure accumulator. An electronic control and regulating unit is provided for actuating the electrically controllable pressure provision device and/or the electrically controllable shutoff valve so as to regulate the hydraulic pressure which is provided by the pressure provision device and the high-pressure accumulator If a pressure buildup is carried out by activation of the pressure provision device, the high-pressure accumulator is connected only temporarily by at least partial opening of the shutoff valve.

14 Claims, 3 Drawing Sheets

(56) References Cited

FOREIGN PATENT DOCUMENTS

| | | |
|---|---|---|
| DE | 10 2004 014 171 A1 | 3/2006 |
| DE | 10 2006 040 424 A1 | 3/2008 |
| DE | 10 2006 043 826 A1 | 3/2008 |
| DE | 10 2008 010 704 A1 | 8/2009 |
| DE | 10 2008 019 148 A1 | 10/2009 |
| DE | 10 2009 033 499 A1 | 1/2010 |
| EP | WO 03/093082 A1 | 11/2003 |

OTHER PUBLICATIONS

PCT International Search Report—Mar. 31, 2011.

\* cited by examiner

METHOD FOR OPERATING A BRAKING SYSTEM

CROSS-REFERENCE TO RELATED APPLICATIONS

This application claims priority to German Patent Application No. 10 2010 028 279.9, filed Apr. 28, 2010 and PCT/EP2010/070011, filed Dec. 17, 2010.

FIELD OF THE INVENTION

The invention relates to a method for operating a braking system for motor vehicles.

BACKGROUND AND SUMMARY OF THE INVENTION

German Patent DE 10 2009 033 499 A1 discloses a braking system having a brake master cylinder, which has at least one brake master cylinder piston and to which wheel brake circuits are connected, an electrically controllable pressure provision device, an electronic control and regulating unit for actuating the electrically controllable pressure provision device so as to regulate the hydraulic pressure output by the latter, and a pedal decoupling unit, which is inserted ahead of the brake master cylinder and has a retaining piston, the first annular surface of which combines with the brake master cylinder piston to delimit a first hydraulic chamber, which can be supplied with the pressure output by the electrically controllable pressure provision device. Supplying pressure to the first hydraulic chamber causes a force to be exerted on the brake master cylinder piston in an actuating direction and on the retaining piston counter to the actuating direction. The electrically controllable pressure provision device can be designed as an electrohydraulic actuator consisting essentially of a hydraulic cylinder/piston arrangement and an electric motor, which drives the piston. In addition, a high-pressure accumulator is provided in the braking system, and this can be charged by the electrically controllable pressure provision device via a shutoff valve. In order to enhance the dynamics of the braking system during pressure buildup operations, especially highly dynamic braking operations, DE 10 2009 033 499 A1 makes provision for the shutoff valve of the high-pressure accumulator to be switched to the open operating position thereof simultaneously with the activation of the electrically controllable pressure provision device, ensuring that the first hydraulic chamber is supplied with the pressure medium under high pressure in the high-pressure accumulator in addition to the volume of pressure medium made available by the pressure provision device. This operation results in a rapid pressure buildup in the first chamber and hence in the brake master cylinder and the wheel brakes. In the method, described in DE 10 2009 033 499 A1, of connecting the high-pressure accumulator, the shutoff valve is therefore opened simultaneously with the activation of the pressure provision device, and the first hydraulic chamber is supplied with pressure medium simultaneously by the pressure provision device and the high-pressure accumulator.

In order to achieve a pressure buildup time which is as short as possible, the accumulator volume of the high-pressure accumulator should be as large as possible since the achievable pressure buildup time depends on the accumulator volume, more specifically the minimum achievable pressure buildup time increases as the accumulator volume grows smaller. Owing to the production costs and the limited installation space available for the high-pressure accumulator, however, it is often desirable that the selected accumulator volume of the high-pressure accumulator should be as small as possible.

It is therefore the underlying object of the present invention to provide a method for operating a braking system by means of which a sufficiently rapid pressure buildup can be achieved, even when using a high-pressure accumulator with a small accumulator volume.

SUMMARY OF THE INVENTION

According to the invention, the above mentioned object is achieved by means of a method described herein.

The invention is based on the idea that the high-pressure accumulator is added to the pressure provision device only temporarily in order to build up the pressure.

The method proposed offers the advantage that a high-pressure accumulator of relatively small volume can be used for reasons of cost reduction and/or the small amount of installation space available without the need to accept significant sacrifices in terms of the rapidity of a pressure buildup in the braking system.

According to a preferred embodiment, the high-pressure accumulator is connected and disconnected again in a regulated manner.

In a particularly preferred embodiment, the high-pressure accumulator is connected or disconnected in accordance with an actuation of a brake pedal by the vehicle driver detected by a sensor device for detecting the driver deceleration requirement and/or in accordance with a pressure detected by a sensor device, and/or in accordance with a piston travel of the braking system detected by a sensor device.

The high-pressure accumulator is preferably chargeable by the electrically controllable pressure provision device. To charge the high-pressure accumulator, it is advantageous if the shutoff valve provided between the electrically controllable pressure provision device and the high-pressure accumulator is opened and the pressure provision device is activated so as to produce pressure.

The shutoff valve is preferably designed as an electromagnetically actuable 2/2-way valve.

According to a preferred embodiment of the invention, the wheel brakes are supplied with pressure medium indirectly, e.g. via a brake master cylinder, by means of the pressure provision device or by means of the pressure provision device and the high-pressure accumulator. This can be accomplished, for example, by applying pressure to a hydraulic chamber, as described in DE 10 2009 033 499 A1. However, another preferred option is for the wheel brakes to be supplied with pressure medium directly by means of the pressure provision device or by means of the pressure provision device and the high-pressure accumulator.

A hydraulic brake pressure modulation unit is preferably inserted between the pressure provision device and the wheel brakes or between the brake master cylinder and the wheel brakes, allowing braking operations on individual brake circuits or on selected wheels.

In another preferred option, the high-pressure accumulator has an accumulator pressure of about 90 to 110 bar.

According to a preferred embodiment of the method according to the invention, the high-pressure accumulator is not connected when the braking system is in a slip control mode, e.g. antilock control (ABS control) or vehicle dynamics control mode, e.g. ESC control mode (ESC: electronic stability control).

The braking system preferably comprises a brake pedal and a sensor device for detecting a driver deceleration requirement. This sensor signal is then preferably used for connecting and disconnecting the high-pressure accumulator. Thus, for example, an emergency braking operation can be detected and a more rapid pressure buildup achieved by temporary connection of the high-pressure accumulator.

In another preferred option, the braking system comprises a brake master cylinder which has at least one master cylinder piston and to which wheel brake circuits are connected, wherein the brake master cylinder and hence the wheel brakes can be actuated by the pressure provision device.

Pressure sensors are preferably provided in the braking system in order to detect the pressure in one of the pressure chambers of the brake master cylinder and/or the pressure supplied by the electrically controllable pressure provision device and/or at least one of the wheel brake pressures. At least one of these sensor signals is then preferably evaluated for the purpose of connecting and disconnecting the high-pressure accumulator. Thus, for example, the high-pressure accumulator can be disconnected again when the friction linings of the wheel brakes are deemed to have been reliably applied upon attainment of a wheel brake pressure threshold value.

The hydraulic braking system is preferably controllable both by the vehicle driver and independently of the vehicle driver.

BRIEF DESCRIPTION OF THE DRAWINGS

Further preferred embodiments of the invention will become apparent from the dependent claims and the following description with reference to figures, in which:

DETAILED DESCRIPTION OF THE INVENTION

Figure 1:
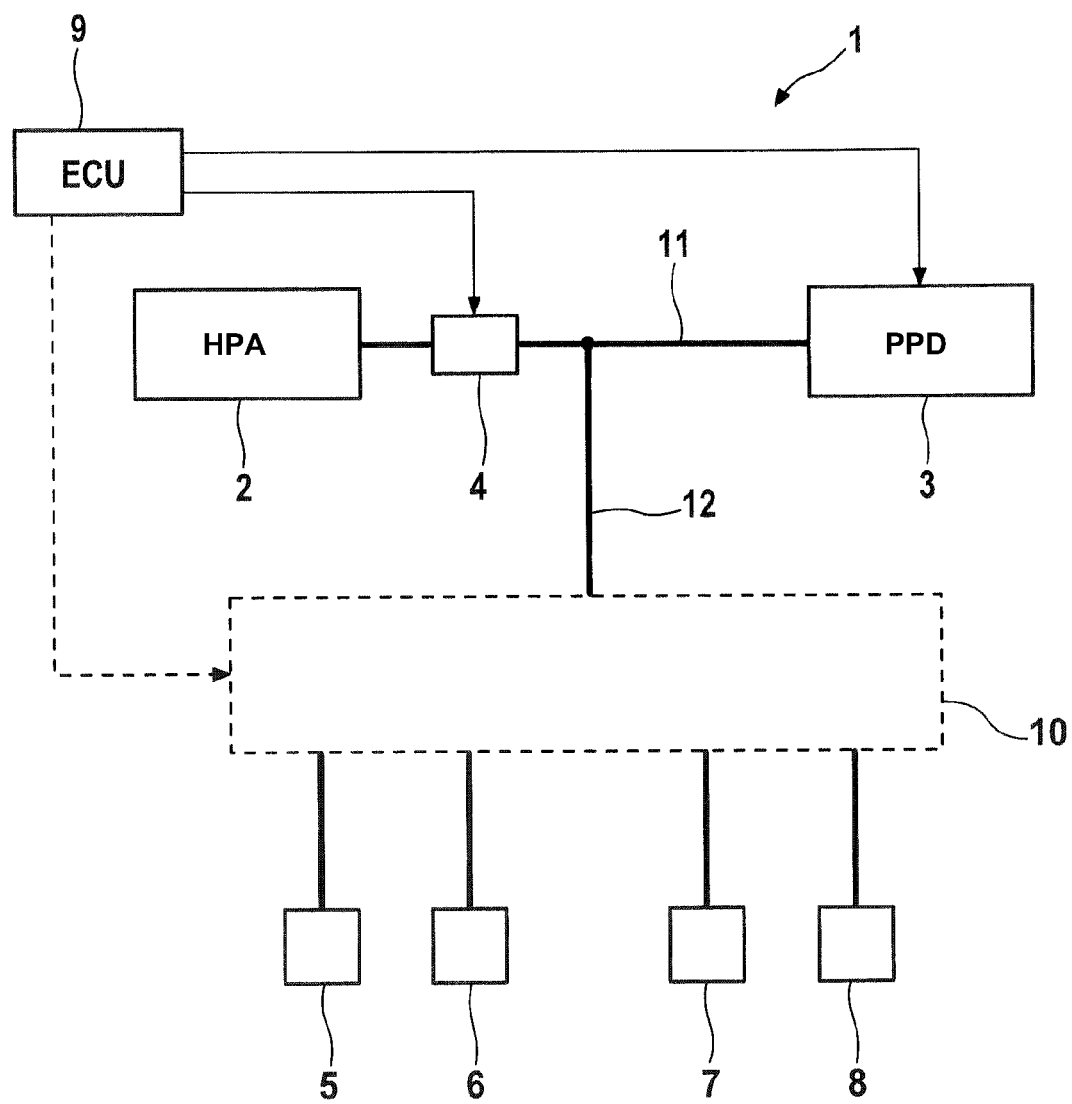
FIG. 1 shows a schematic representation of an illustrative embodiment of a braking system for carrying out a method according to the invention.

The illustrative embodiment of a braking system 1 for carrying out a method according to the invention, which is shown in a greatly simplified and schematic way in FIG. 1, comprises an electrically controllable pressure provision device 3, a high-pressure accumulator 2 (HDS) and an electrically controllable shutoff valve 4, by means of which a hydraulic connection 11 between the pressure provision device 3 and the high-pressure accumulator 2 can be established and interrupted. The shutoff valve 4 can be embodied as an electromagnetically actuable 2/2-way valve which is closed when deenergized, for example. The pressure provision device 3 and the high-pressure accumulator 2 are connected by a hydraulic connection 12 to wheel brakes 5, 6, 7, 8 of the braking system 1, thus allowing the wheel brakes 5, 6, 7, 8 to be supplied with pressure medium by means of the pressure provision device 3 and/or the high-pressure accumulator 2.

The wheel brakes 5, 6, 7, 8 can be supplied with pressure medium either directly or indirectly, via a hydraulic arrangement 10, by the pressure provision device 3 and/or the high-pressure accumulator 2. To illustrate this fact, the optional hydraulic arrangement 10 is shown in broken lines in FIG. 1.

The hydraulic arrangement 10 can include a brake master cylinder or tandem master cylinder, for example, the brake master cylinder piston of which can be actuated by the pressure output by the electrically controllable pressure provision device 3 (and, if appropriate, the high-pressure accumulator 2). Wheel brake circuits are then connected to the pressure chamber of the brake master cylinder or to the pressure chambers of the tandem brake master cylinder, supplying the wheel brakes 5-8 of the braking system 1 with hydraulic pressure medium (if appropriate with the interposition of a controllable wheel brake pressure modulation module, see below).

In addition or as an alternative, the hydraulic arrangement 10 can comprise a wheel brake pressure modulation module. The wheel brake pressure modulation module has pressure modulation valves on the inlet side of the wheel brakes 5-8, allowing ABS and/or ESC brake control operations (ABS: antilock braking system; ESC: electronic stability control), for example. Eight pressure modulation valves are usual for carrying out ABS control operations, and twelve pressure modulation valves are usual for carrying out ESC control operations. As an alternative, it is also possible to use a considerably simpler wheel brake pressure modulation module with four pressure modulation valves, allowing wheel brake pressure modulation by the "multiplex principle", which is known to those skilled in the art.

The braking system 1 furthermore comprises an electronic control and regulating unit 9 (ECU). Control and regulating unit 9 actuates the electrically controllable pressure provision device (PPD) 3 and/or the electrically controllable shutoff valve 4 so as to regulate the hydraulic pressure provided by the pressure provision device 3 and the high-pressure accumulator (HPA) 2, e.g. in line 12. In the case of a hydraulic arrangement 10, the components of the hydraulic arrangement 10 (e.g. the pressure modulation valves) can likewise be controlled by the control and regulating unit 9 in order to carry out brake pressure modulation in individual brake circuits or at selected wheels, for example.

The electrically controllable pressure provision device 3 is designed as an electrohydraulic actuator, which consists essentially of a hydraulic cylinder/piston arrangement and of an electric motor, which drives the piston of the arrangement, preferably with the interposition of a "rotation-translation mechanism". The actuating travel of the piston or the angular position of the rotor of the electric motor can be detected by a displacement or position sensor.

If the high-pressure accumulator 2 is supposed to be charged by the pressure provision device 3, the hydraulic connections leading to the wheel brakes 5-8 are shut off, e.g. by isolating valves contained in the wheel pressure modulation module, and the shutoff valve 4 is opened, with the result that the pressure medium volume displaced by the pressure provision device 3 charges the high-pressure accumulator 2. The pressure provided by the pressure provision device 3 is monitored by a pressure sensor, for example.

Figure 2:
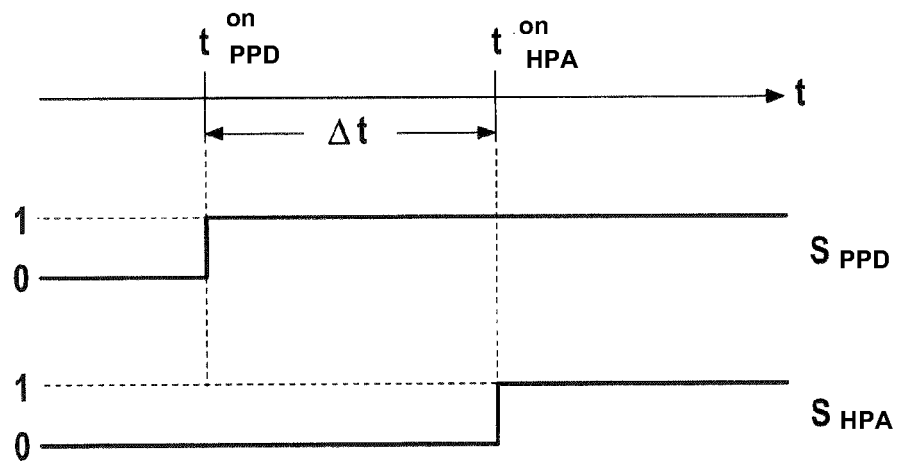
FIG. 2 shows a time diagram intended to illustrate a first illustrative embodiment of a method according to the invention.
Figure 3:
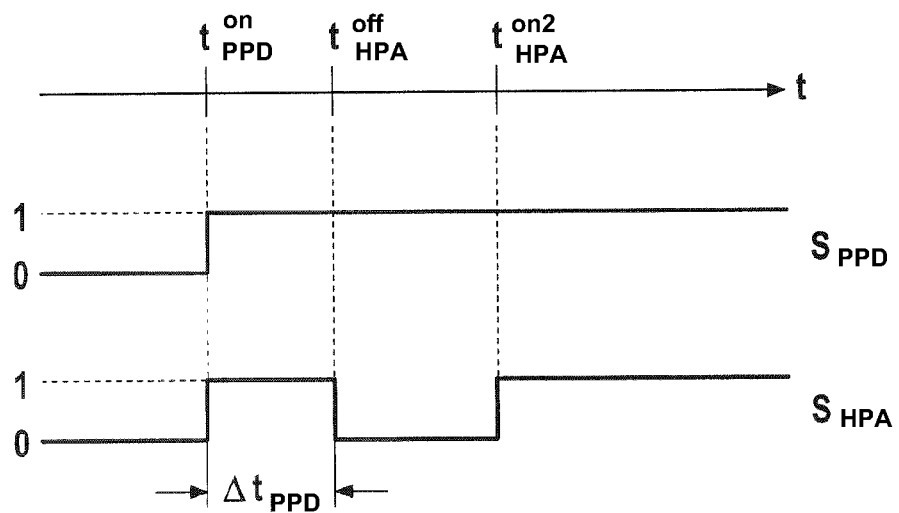
FIG. 3 shows a time diagram intended to illustrate a second illustrative embodiment of a method according to the invention, and FIG. 4 by way of example, shows time profiles of a pressure medium volume in the high-pressure accumulator and of a pressure which is achieved.

FIGS. 2 and 3 show two time diagrams in schematic form intended to illustrate a first and a second illustrative embodiment of a method according to the invention. For this purpose, a time trace (arrow) is depicted, on which times are marked, and below the time trace respective control signals for the pressure provision device 3 ($S_{PPD}$) and the shutoff valve 4 of the high-pressure accumulator 2 ($S_{HPA}$) are shown schematically. Here, a signal level $S_{PPD}$ of "0" for the pressure provision device 3 corresponds to an unactivated pressure provision device 3, and a signal level $S_{PPD}$ of "1" corresponds to an activated pressure provision device 3, i.e. by means of the piston of the pressure provision device 3, which is driven by the electric motor, pressure medium volume is displaced from the cylinder of the pressure provision device 3, flows into the hydraulic lines 11 and 12 and thus leads to a pressure buildup. A signal level $S_{HPA}$ of "0" means that the shutoff valve 4 is closed and hence that the high-pressure accumulator 2 is not connected, a signal level $S_{HPA}$ of "1" means that the shutoff valve 4 is open and the high-pressure accumulator 2 is thus connected.

In the case of a request to carry out a braking operation, e.g. in the event of an actuation of the brake pedal by the vehicle driver, which is detected, for example, from the appearance of a signal at the output of a displacement or angular position sensor detecting the driver deceleration requirement, or in the event of a braking request by a driver assistance system, the pressure provision device 3 is triggered and activated by the control and regulating unit 9 in order to carry out a pressure buildup at the wheel brakes 5-8. There is a corresponding change in the signal level $S_{PPD}$ at the time $t^{on}_{PPD}$ of activation from "0" to "1", as also illustrated in FIGS. 2 and 3.

According to the first illustrative embodiment, which is illustrated in FIG. 2, the high-pressure accumulator 2 is connected only after the expiry of a time period $\Delta t$ following activation+n of the pressure provision device 3. There is a corresponding change in the signal level $S_{HPA}$ from "0" to "1" at a time $t^{on}_{HPA}$, where $t^{on}_{HPA} = t^{on}_{PPD} + \Delta t$ It has been found that a shorter pressure buildup time can be achieved for a high-pressure accumulator 2 with a predetermined small accumulator volume if the high-pressure accumulator 2 is connected with a certain delay (time period $\Delta t$) relative to the starting of the electric motor of the pressure provision device 3 than if the pressure buildup is performed simultaneously by the pressure provision device 3 and the high-pressure accumulator 2 from the outset (from time $t^{on}_{PPD}$) (i.e. so that $t^{on}_{PPD} = t^{on}_{HPD}$). In this way, it is possible to reduce the accumulator volume of the high-pressure accumulator 2 while nevertheless achieving an adequate short pressure buildup time by means of an appropriate time offset in the connection of the high-pressure accumulator 2.

Figure 4:
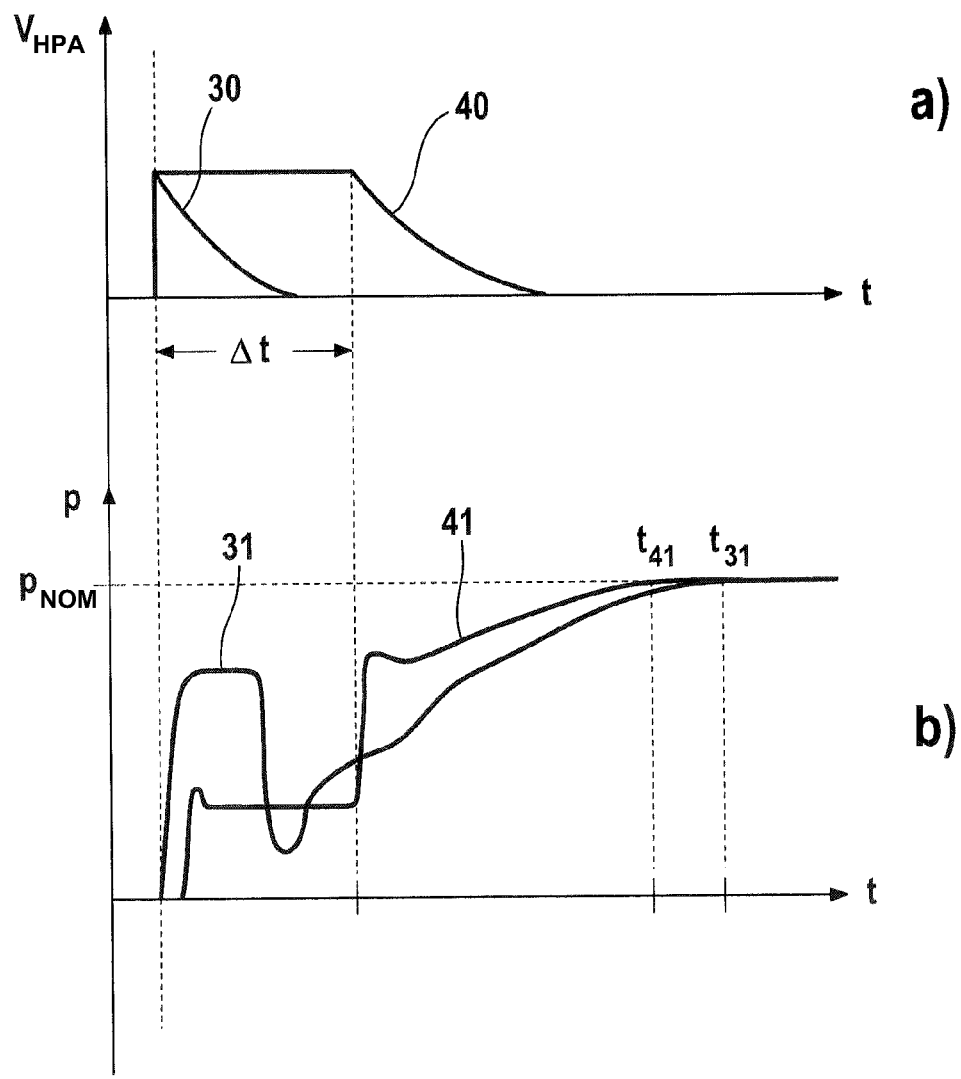

This comparison is shown schematically in FIG. 4. In the upper diagram, FIG. 4*a*), the pressure medium volume in the high-pressure accumulator is shown against time t. Profile 30 corresponds to the case where the pressure provision device 3 and the high-pressure accumulator 2 are activated or connected simultaneously from the same time $t^{on}_{PPD}$. Profile 40 corresponds to the case where the high-pressure accumulator 2 is connected only after the time $\Delta t$ (as shown in FIG. 2). In the lower diagram, FIG. 4 *b*), the pressure p in line 11 or 12 is shown against time t. Profile 31 corresponds to the case where the pressure provision device 3 and the high-pressure accumulator 2 are activated or connected simultaneously from the same time $t^{on}_{PPD}$. Profile 41 corresponds to the case where the high-pressure accumulator 2 is connected only after the time $\Delta t$ (as shown in FIG. 2). The connection of the high-pressure accumulator 2 with a time offset has the effect that the desired or nominal pressure $p_{nom}$ is achieved at an earlier time $t_{41}$ than this pressure $p_{nom}$ is achieved in the case of a simultaneous pressure buildup by the pressure provision device 3 and the high-pressure accumulator 2 (time $t_{31}$).

The optimum delay time $\Delta t$, which leads to a minimum pressure buildup time, depends on the accumulator volume, the accumulator pressure and also on the desired pressure. By way of example, the high-pressure accumulator has an accumulator pressure of about 90 to 110 bar. The accumulator volume is about 2 to 5 cm$^3$.

In a simplified illustrative embodiment, a fixed delay time $\Delta t$ is specified since the accumulator volume and the accumulator pressure are predetermined by the design of the braking system.

According to the second illustrative embodiment, illustrated in FIG. 3, the high-pressure accumulator 2 is connected simultaneously with the activation of the pressure provision device 3, i.e. $t^{on}_{HPA} = t^{on}_{PPD}$. There is also a corresponding change in the signal level $S_{HPA}$ from "0" to "1" at time $t^{on}_{PPD}$. After a time period $\Delta t_{HPA}$, the high-pressure accumulator 2 is disconnected again (time $t^{off}_{HPA}$, where $t^{off}_{HPA} = t^{on}_{PPD} + \Delta t$ HPA). At a later time $t^{on}_{HPA}$, the high-pressure accumulator can then be connected again.

By way of example, the times $t^{on}_{HPA}$, $t^{on2}_{HPA}$, and $t^{off}_{HPA}$ at which the high-pressure accumulator 2 is connected and disconnected again are chosen in accordance with pressures or piston positions in the braking system 1, i.e. regulated connection of the high-pressure accumulator is carried out in accordance with the state of the braking system or with the braking requirement.

By way of example, the time period $\Delta t_{HPA}$ after which the high-pressure accumulator 2 is disconnected again, and hence the time $t^{off}_{HPA}$ are chosen in accordance with the wheel brake pressure at one wheel brake or at all the wheel brakes or in accordance with the feed pressure of the brake master cylinder. Thus, by way of example, the high-pressure accumulator 2 is disconnected again when this pressure has reached a predetermined threshold value (e.g. 10 bar), at which, for example, it is certain that the brake linings are resting against the brake disk. Thus, at the beginning of the braking operation, the application of the brake linings is assisted by the high-pressure accumulator, and the high-pressure accumulator is disconnected again when a predetermined application pressure is reached in the wheel brakes (e.g. 10 bar) and remains disconnected for a certain time, after which it is connected again.

As an alternative or in addition, it is also possible for the time of connection $t^{on}_{HPA}$, $t^{on2}_{HPA}$ of the high-pressure accumulator 2 to be chosen in accordance with the actuation of the brake pedal, e.g. the brake pedal actuation speed. This can be determined by means of a displacement or angular position sensor detecting the driver deceleration requirement. From a rapid actuation of the brake pedal, it is possible to infer an emergency braking operation, the desire being for rapid application of the brake linings and/or as rapid a pressure buildup as possible by way of an emergency braking assistance function. By way of example, regulated temporary connection of the high-pressure accumulator 2 is carried out accordingly.

By way of example, the high-pressure accumulator 2 is not connected when the braking system is in a slip control mode, e.g. antilock control (ABS control) or vehicle dynamics control mode, e.g. ESC control mode (ESC: electronic stability control) since, in such situations, connection of the high-pressure accumulator is not necessary if, for example, the lockup pressure is low.

While the above description constitutes the preferred embodiment of the present invention, it will be appreciated that the invention is susceptible to modification, variation, and change without departing from the proper scope and fair meaning of the accompanying claims.

The invention claimed is:

1. A method for operating a hydraulic braking system (1) for motor vehicles having an electrically controllable pressure provision device (3), having a hydraulic cylinder and piston arrangement, the piston of which can be driven by means of an electric motor, a high-pressure accumulator (2), a hydraulic line (11) extending between the pressure provision device (3) and the high-pressure accumulator (2), an electrically controllable shutoff valve (4) arranged in the hydraulic line for establishing and interrupting a hydraulic connection between the pressure provision device and the high-pressure accumulator, wheel brakes (5, 6, 7, 8), which can be supplied with pressure medium via the hydraulic line by means of at least one of the pressure provision device (3) and the high-pressure accumulator (2), and an electronic control and regulating unit (9) for actuating the electrically controllable pressure provision device (3) and the electrically controllable shutoff valve (4) so as to regulate a hydraulic pressure which is provided by at least one of the pressure provision device (3) and the high-pressure accumulator (2), comprising the step of, if a pressure buildup in the hydraulic line is carried out by activating the pressure provision device (3), connecting the high-pressure accumulator (2) only temporarily during the pressure buildup by at least partial opening of the shutoff valve (4).

2. The method as claimed in claim 1, further comprising the step of connecting and disconnecting the high-pressure accumulator (2) in a regulated manner.

3. The method as claimed in claim 1 wherein a connect time at which the high-pressure accumulator (2) is connected ($t^{on}_{HPA}$) and a disconnect time at which the high-pressure accumulator (2) is subsequently disconnected ($t^{off}_{HPA}$) are implemented in accordance with an actuation of a brake pedal by the vehicle driver detected by a sensor device for detecting a driver deceleration requirement.

4. The method as claimed in claim 3, wherein a connect time at which the high-pressure accumulator (2) is connected ($t^{on}_{HPA}$) and a disconnect time at which the high-pressure accumulator (2) is subsequently disconnected ($t^{off}_{HPA}$) are implemented in accordance with a speed of actuation of the brake pedal.

5. The method as claimed in claim 1, wherein a connect time at which the high-pressure accumulator (2) is connected ($t^{on}_{HPA}$) and a disconnect time at which the high-pressure accumulator (2) is subsequently disconnected ($t^{off}_{HPA}$) are implemented in accordance with a pressure detected by a sensor device.

6. The method as claimed in claim 5, wherein the high-pressure accumulator (2) is subsequently disconnected at the disconnect time ($t^{off}_{HPA}$) when the pressure, in the form of a wheel brake pressure, reaches a predetermined pressure threshold value.

7. The method as claimed in claim 5, wherein the high-pressure accumulator (2) is connected at the connect time at a time ($t^{on}_{PPD}$) of activation of the pressure provision device (3), and is subsequently disconnected at the disconnect time by closing the shutoff valve (4) when the pressure, in the form of a wheel brake pressure reaches a predetermined pressure threshold value.

8. The method as claimed in claim 5, wherein the pressure detected by the sensor device is in the form of a wheel brake pressure or a brake master cylinder pressure.

9. The method as claimed in claim 1, wherein the high-pressure accumulator (2) is connected at a time ($t^{on}_{PPD}$) of activation of the pressure provision device (3), and is subsequently disconnected after a predetermined or specified time period ($\Delta t_{HPA}$) by closing the shutoff valve (4).

10. The method as claimed in claim 1 wherein the pressure buildup takes place in accordance with an actuation of a brake pedal detected by a sensor device for detecting a driver deceleration requirement.

11. The method as claimed in claim 1 wherein the high-pressure accumulator (2) is not connected when the pressure buildup is requested by a slip control system or a vehicle dynamics control system.

12. The method as claimed in claim 1, wherein a connect time at which the high-pressure accumulator (2) is connected ($t^{on}_{HPA}$) and a disconnect time at which the high-pressure accumulator (2) is subsequently disconnected ($t^{off}_{HPA}$) are implemented in accordance with a piston travel of the braking system (1) detected by a sensor device.

13. A method for operating a hydraulic braking system (1) for motor vehicles having an electrically controllable pressure provision device (3), having a hydraulic cylinder and piston arrangement, the piston of which can be driven by means of an electric motor, a high-pressure accumulator (2), a hydraulic line (11) extending between the pressure provision device (3) and the high-pressure accumulator (2), an electrically controllable shutoff valve (4) arranged in the hydraulic line for establishing and interrupting a hydraulic connection between the pressure provision device and the high-pressure accumulator, wheel brakes (5, 6, 7, 8), which can be supplied with pressure medium via the hydraulic line by means of at least one of the pressure provision device (3) and the high-pressure accumulator (2), and an electronic control and regulating unit (9) for actuating the electrically controllable pressure provision device (3) and the electrically controllable shutoff valve (4) so as to regulate a hydraulic pressure which is provided by at least one of the pressure provision device (3) and the high-pressure accumulator (2), comprising the step of, if a pressure buildup in the hydraulic line is carried out by activating the pressure provision device (3), connecting the high-pressure accumulator (2) temporarily by at least partial opening of the shutoff valve (4), wherein the high-pressure accumulator (2) is connected after a predetermined time period ($\Delta t$) after a time ($t^{on}_{PPD}$) of activation of the pressure provision device (3).

14. A braking system (1) for motor vehicles, comprising:
an electrically controllable pressure provision device (3), in the form of a hydraulic cylinder and piston arrangement, the piston of which can be driven by means of an electric motor,
a high-pressure accumulator (2), which can be connected to the pressure provision device (3) via a hydraulic line (11), in which an electrically controllable shutoff valve (4) is arranged,
wheel brakes (5, 6, 7, 8), which can be supplied with a pressure medium by means of at least one of the pressure provision device (3) and the high-pressure accumulator (2),
an electronic control and regulating unit (9) for actuating the electrically controllable pressure provision device (3) and the electrically controllable shutoff valve (4) so as to regulate a hydraulic pressure which is provided by the pressure provision device (3) and the high-pressure accumulator (2),
the electronic control and regulating unit (9) controlling the system to activate the pressure provision device when a pressure buildup in the hydraulic line is carried out and connecting, via the hydraulic line, the high pressure accumulator only temporarily during the pressure buildup by at least partial opening of the shutoff valve.

* * * * *